US008909968B2

(12) United States Patent
Yang

(10) Patent No.: US 8,909,968 B2
(45) Date of Patent: Dec. 9, 2014

(54) SERVER AND METHOD OF RECORDING ENVIROMENT PARAMETERS OF SERVER

(75) Inventor: Feng-Chi Yang, New Taipei (TW)

(73) Assignee: Hon Hai Precision Industry Co. Ltd., New Taipei (TW)

( * ) Notice: Subject to any disclaimer, the term of this patent is extended or adjusted under 35 U.S.C. 154(b) by 236 days.

(21) Appl. No.: 13/597,236

(22) Filed: Aug. 28, 2012

(65) Prior Publication Data

US 2013/0268796 A1 Oct. 10, 2013

(30) Foreign Application Priority Data

Apr. 6, 2012 (CA) .......................... 2012 1 0098818

(51) Int. Cl.
*G06F 1/00* (2006.01)
*G06F 11/30* (2006.01)

(52) U.S. Cl.
USPC .......................................... 713/340; 713/330

(58) Field of Classification Search
USPC .................................................. 713/330, 340
IPC ......................................... G06F 11/22,11/2284
See application file for complete search history.

(56) References Cited

U.S. PATENT DOCUMENTS

| 7,725,742 | B2* | 5/2010 | Hirai et al. .................... 713/300 |
| 2004/0078723 | A1* | 4/2004 | Gross et al. .................... 714/47 |
| 2005/0273585 | A1* | 12/2005 | Leech ............................... 713/1 |
| 2005/0288903 | A1* | 12/2005 | Jackson et al. ............... 702/187 |
| 2009/0150660 | A1* | 6/2009 | Yao et al. ........................... 713/2 |
| 2009/0171473 | A1* | 7/2009 | Matsuda et al. ................. 700/3 |
| 2012/0029876 | A1* | 2/2012 | Saitoh et al. ................ 702/184 |

* cited by examiner

*Primary Examiner* — Vincent Tran
(74) *Attorney, Agent, or Firm* — Novak Druce Connolly Bove + Quigg LLP

(57) ABSTRACT

A server and a method of recording environment parameters of the server are provided. The server defines an power connection mode and a power on mode. The server includes an environment monitoring system, which monitors an environment of the server in real time. The environment monitoring system includes a control unit and storage unit. The control unit controls power connection information and startup information to store in the storage unit. The power connection information comprises power connection time, a power connection count, and induction information of the server when the server enters the power connection mode. The startup information comprises startup time, a startup count, induction information of the server, and the hardware load information when the server enters the power on mode. The power connection information and the startup information forms the environment parameters of the server.

14 Claims, 5 Drawing Sheets

SERVER AND METHOD OF RECORDING ENVIROMENT PARAMETERS OF SERVER

BACKGROUND

1. Technical Field

The disclosure relates to servers and, more particularly, to a server and a method of recording environment parameters in relation to the server.

2. Description of Related Art

Environment parameters of a server are utilized for a reliability test of a server. However, an administrator must manually record the environment parameters of the server, such as environment temperature, and it is very inconvenient.

Therefore, what is needed is a server to overcome the described shortcoming.

DETAILED DESCRIPTION

Figure 1:
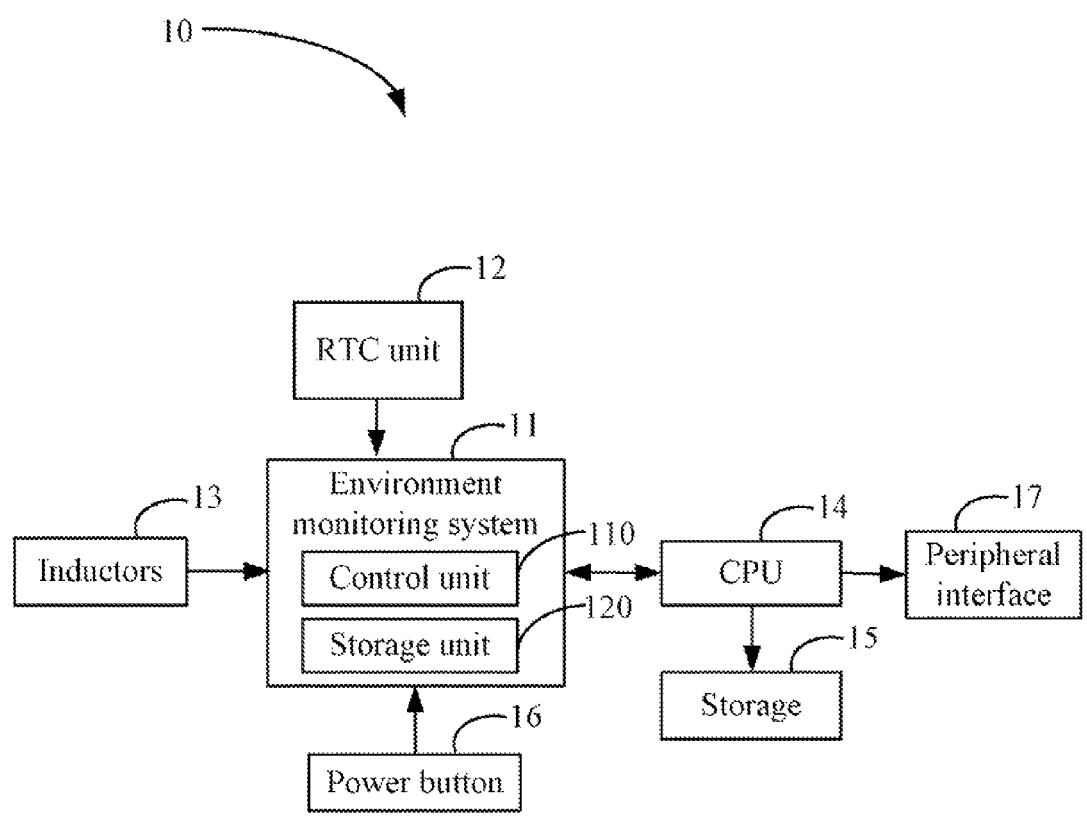
FIG. 1 is a schematic view of a server in accordance with an exemplary embodiment.

FIG. 1 is a schematic view of a server in accordance with an exemplary embodiment. The server 10 includes an environment monitoring system 11, a RTC unit 12, a number of inductors 13, a CPU 14, storage 15, a power button 16, and a peripheral interface 17. The environment monitoring system 11 monitors the environment of the server 10 in real time. The server 10 defines a power connection mode and a power on mode according to the environment of the server 10. In the power connection mode, the server 10 is only connected with power. In the power connection mode the environment monitoring system 11 is provided by a small voltage, and only the environment monitoring system 11 is working. In the power on mode, the server 10 is connected with power and the power button 16 is pressed for power to supply all components of the server 10, in other words, both the environment monitoring system 11 and the CPU 14 work.

The environment monitoring system 11 includes a control unit 110 and a storage unit 120. The control unit 110 controls the environment monitoring system 11 to work. The storage unit 120 stores information in response to a control of the control unit 110 each monitoring cycle, such as one hour. The RTC unit 12 measures time in real time. The inductors 13 induct the environment of the server 10 and generate induction information, such as voltage, environment temperature, and rotation speed of the fans of the server 10, for example.

As is well known in the art, the CPU 14 controls the server 10 to work while in the power on mode, playing music, for example. The storage 15 stores information in response to a control of the CPU 14. As described above, in the power connection mode, the environment monitoring system 11 works and the CPU 14 does not work; in the power on mode, both the environment monitoring system 11 and the CPU 114 are working. The peripheral interface 17 is connected with a peripheral device (not shown).

Figure 2:
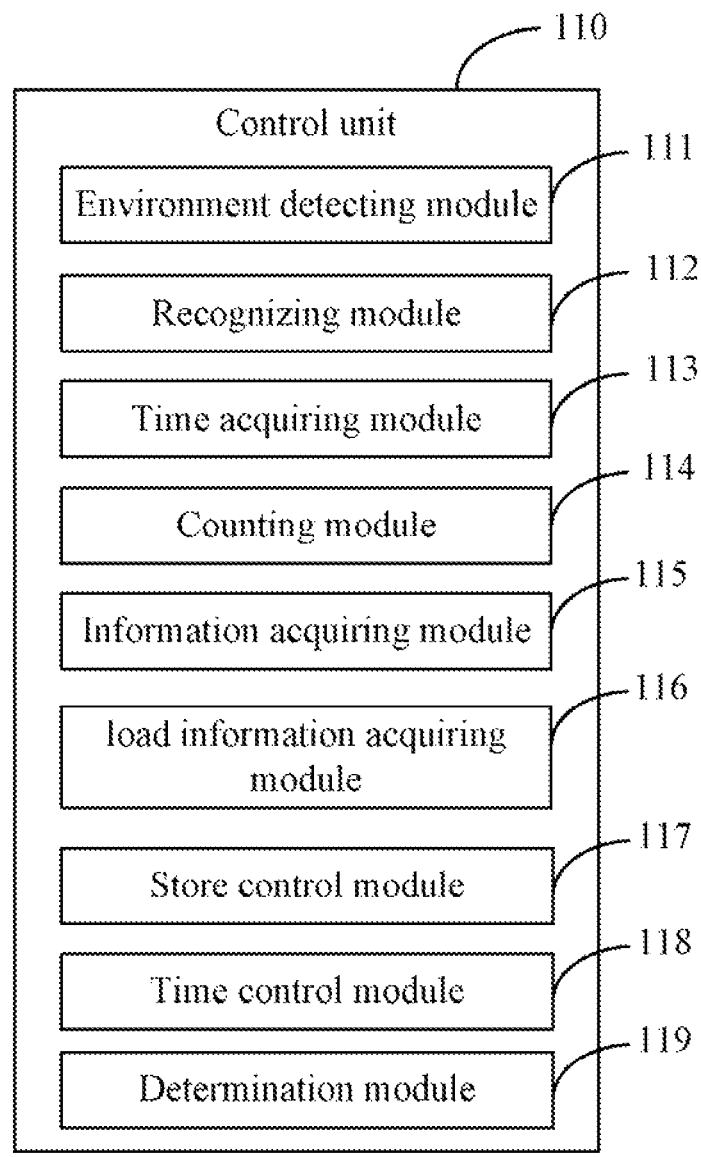
FIG. 2 is a block diagram of a control unit of the server of FIG. 1.

Referring to FIG. 2, the control unit 110 of the embodiment is shown. The control unit 110 includes an environment detecting module 111, a recognizing module 112, a time acquiring module 113, a counting module 114, an information acquiring module 115, a load information acquiring module 116, a store control module 117, a time control module 118, and a determination module 119. Functions of all modules are described in FIGS. 3-5 in implementing a method of recording environment parameters.

Figure 3:
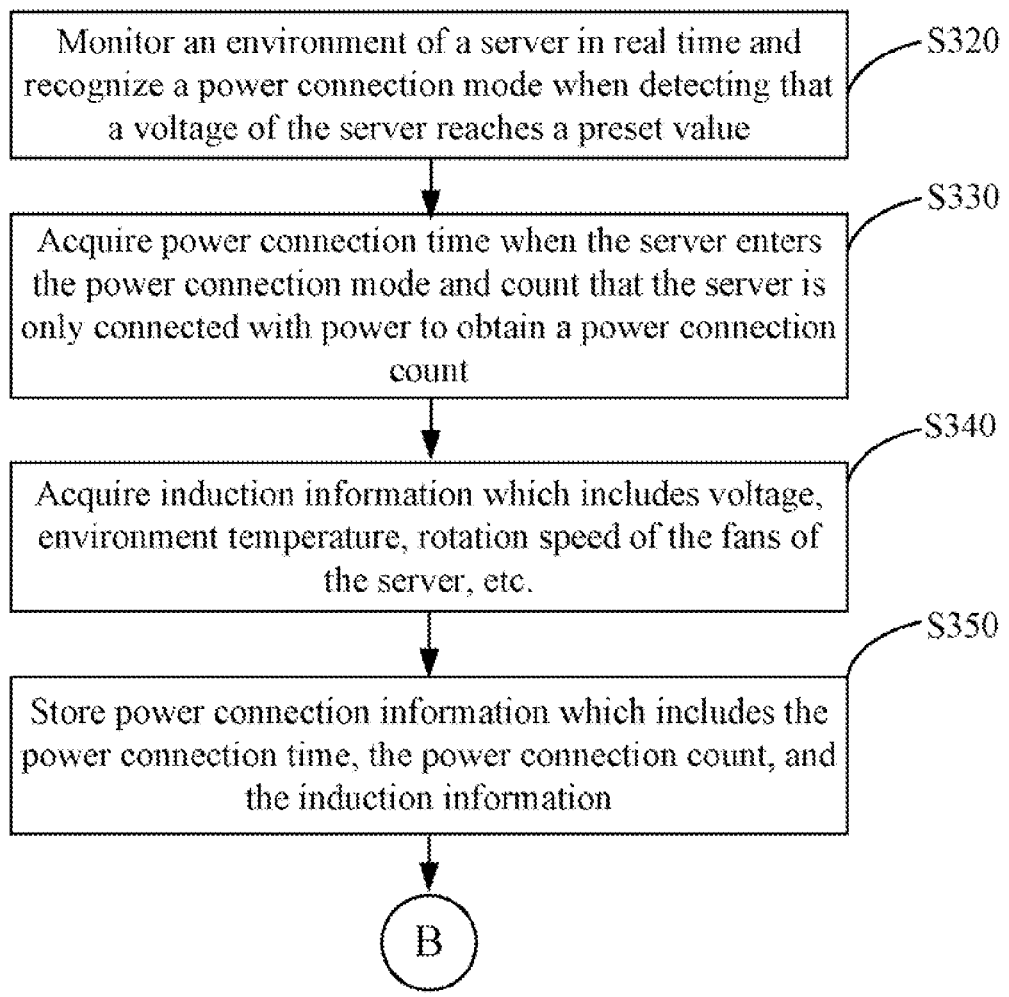
FIGS. 3-5 illustrate flowcharts of a method of recording environment parameters of the server of FIG. 1, in accordance with an exemplary embodiment.

Referring to FIG. 3, in step S320, the environment detecting module 111 monitors the environment of the server 10 in real time, and when the environment detecting module 111 monitors that a voltage of the server 10 reaches a preset voltage, such as an auxiliary voltage of 5v, the recognizing module 112 recognizes that the server 10 enters the power connection mode.

In step S330, the time acquiring module 113 acquires power connection time when the server 10 enters the power connection mode. Namely, the server 10 is only connected with power, and the counting module 114 counts that the server 10 enters the power connection mode to obtain a power connection count. In step S340, the information acquiring module 115 acquires induction information of the server 10, such as voltage, environment temperature, rotation speed of the fans of the server 10. In step S350, the store control module 117 stores power connection information in the storage unit 120, wherein the power connection information includes the power connection time, the power connection count, and the induction information of the server 10, and the procedure goes to "B" shown in FIG. 5.

Figure 4:
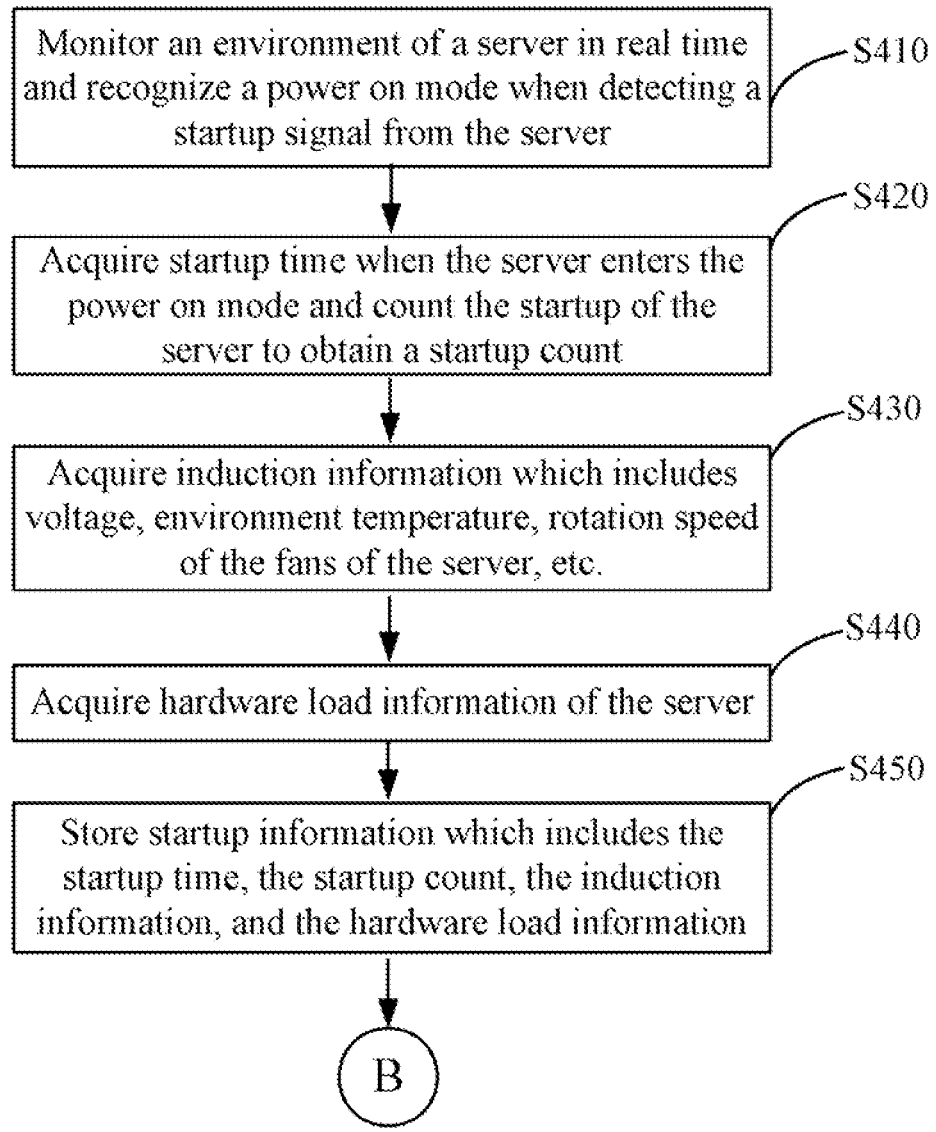

Referring to FIG. 4, in step S410, the environment detecting module 111 monitors the environment of the server 10 in real time, and when the power button 16 is pressed and the environment detecting module 111 monitors a startup signal of the server 10, the recognizing module 112 recognizes that the server 10 enters the power on mode. In step S420, the time acquiring module 113 acquires startup time when the server 10 enters the power on mode, and the counting module 114 counts the startup of the server 10 to obtain a startup count. In step S430, the information acquiring module 115 acquires induction information of the server 10, such as a voltage, an environment temperature, rotate speed of fans of the server 10, wherein the induction information in the power on mode is different from the induction information in the power connection mode.

In step S440, the load information acquiring module 116 acquires hardware load information of the server 10, such as the utilization rate of the CPU 14 and the storage space of the storage 15. In step S450, the store control module 117 stores startup information in the storage unit 120, wherein the startup information includes the startup time, the startup count, the induction information, and the hardware load information of the server 10, and the procedure goes to "B" shown in FIG. 5.

Figure 5:
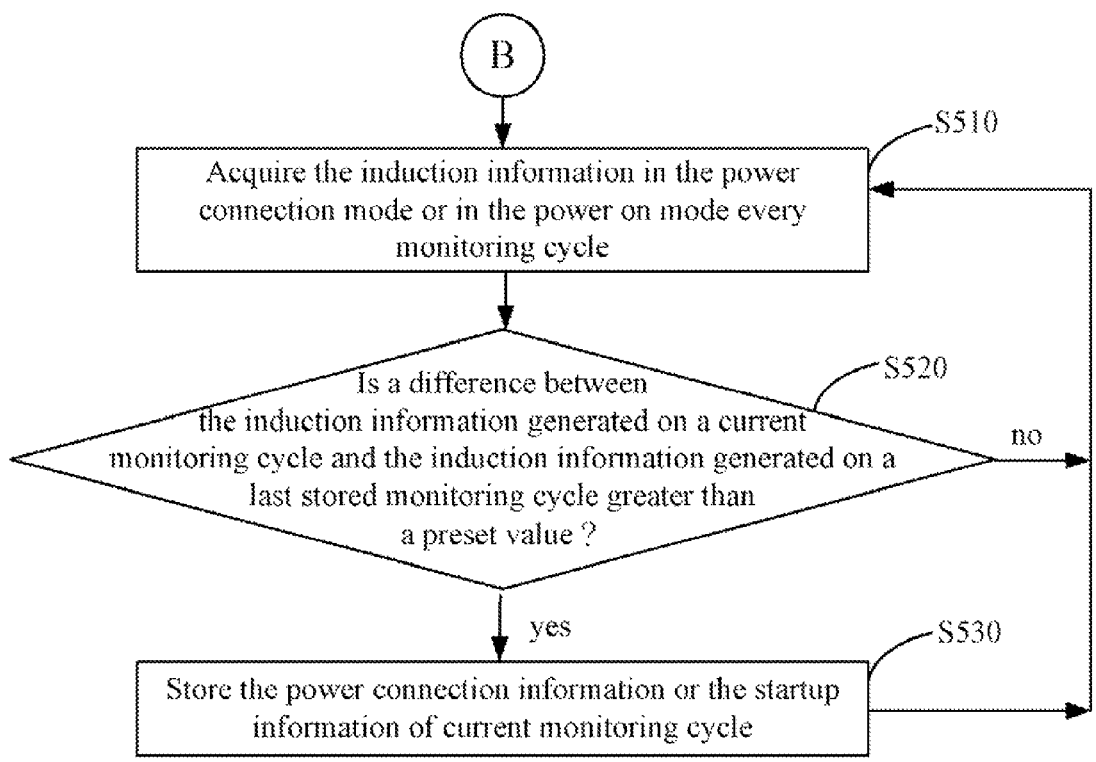

Referring to FIG. 5, in step S510, the time control module 118 controls the information acquiring module 115 to acquire the induction information in the power connection mode or in the power up mode every monitoring cycle. In step S520, the determination module 119 determines whether a difference between the induction information generated on a current monitoring cycle and the induction information generated on the last stored monitoring cycle is greater than a preset value. If the current monitoring cycle is the first monitoring cycle. That is, the server 10 just enters the power connection mode or the power on mode, the determination module 119 determines whether a difference between the induction information generated on the first monitoring cycle and the induction information generated when the server 10 enters the power connection mode or the power on mode at the first time is greater than the preset value.

In step S530, if the determination module 119 determines that the difference between the induction information generated on the current monitoring cycle and the induction information generated on the last stored monitoring cycle is greater than the preset value. That means, the environment of the server 10 at the current monitoring cycle has a big change compared to the last stored monitoring cycle, the store control module 117 stores the power connection or the startup information of the current monitoring cycle in the storage unit 120, and the procedure goes back step S510.

If the determination module 119 determines that the difference between the induction information generated on the current monitoring cycle and the induction information generated on the last stored monitoring cycle is less than the preset value. That means that the environment of the server 10 at the current monitoring cycle has little change or does not change compared to the last stored monitoring cycle. The store control module 117 does not store the power connection or the startup information of the current monitoring cycle in the storage unit 120, and the procedure goes back to step S510. Therefore, the storage unit 120 stores the power connection or the startup information of a number of current monitoring cycles which forms the environment parameters of the server 10.

A manufacture of the server 10 may periodically load the stored power connection or the startup information from the environment monitoring system 11 through the peripheral interface 17. Therefore, when developing new server and performing a reliability test of the new server, the environment parameters of the server are an important reference for improving the performance of the new server.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. A server which defines a power connection mode and a power on mode, wherein when the server is only connected with power, the server enters the power connection mode, and when the server is powered on, the server enters the power on mode, the server comprising:
   a plurality of inductors to generate induction information of the server;
   a RTC unit to measure time in real time; and
   an environment monitoring system comprising:
      a storage unit to store information; and
      a control unit comprising:
         an environment detecting module to monitor an environment of the server in real time;
         a recognizing module to recognize the current mode of the server according to the detected environment of the server;
         a time acquiring module to respectively acquire power connection time when the server enters the power connection mode and startup time when the server enters the power on mode from the RTC unit;
         a counting module to respectively count that the server is only connected with power to obtain a power connection count and the startup of the server to obtain a startup count;
         the induction information acquiring module to respectively acquire induction information of the server when the server enters the power connection mode and the power on mode;
         a load information acquiring module to acquire hardware load information of the server when the server enters the power on mode; and
         a store control module to store power connection information and startup information in the storage unit, wherein the power connection information comprises the power connection time, the power connection count, and the induction information of the server; the startup information comprises the startup time, the startup count, the induction information of the server, and the hardware load information, and the power connection information and the startup information are used as a reference of a reliability test of the server.

2. The server as recited in claim 1, further comprising a power button, wherein when the environment detecting module monitors that a voltage of the server reaches a preset voltage, the recognizing module recognizes that the server enters the power connection mode, when the power button is pressed and the environment detecting module monitors a startup signal of the server, the recognizing module recognizes that the server enters the power on mode.

3. The server as recited in claim 2, further comprising a CPU, wherein when the server enters the power connection mode, the server is only connected with power and the power button is not pressed, and only the environment monitoring system works; when the server enters the power on mode, the server is connected with power and the power button is pressed for power supply, both the environment monitoring system and the CPU work.

4. The server as recited in claim 1, wherein the control unit further comprises a determination module, the determination module determines whether a difference between the induction information generated on a current monitoring cycle and the induction information generated on a last stored monitoring cycle is greater than a preset value, if the determination module determines that the difference between the induction information generated on current monitoring cycle and the induction information generated on the last stored monitoring cycle is greater than the preset value, the store control module stores the power connection information or the startup information of the current monitoring cycle in the storage unit, if the determination module determines that the difference between the induction information generated on current monitoring cycle and the induction information generated on the last stored monitoring cycle is less than the preset value, the store control module does not store the power connection information or the startup information of the current monitoring cycle in the storage unit.

5. The server as recited in claim 4, wherein if the current monitoring cycle is a first monitoring cycle, the determination module determines whether a difference between the induction information generated on the first monitoring cycle and the induction information generated when the server enters the power connection mode or the power on mode at the first time is greater than the preset value.

6. The server as recited in claim 1, wherein the induction information comprises voltage, environment temperature, rotation speed of the fans of the server.

7. The server as recited in claim 1, further comprising a CPU and a storage, wherein the hardware load information comprises the utilization rate of the CPU and the storage space of the storage.

8. A method of recording environment parameters for a server, wherein the server comprises an environment detecting system and defines a power connection mode and a power on mode, when the server is only connected with power, the server enters the power connection mode, and when the server is powered on, the server enters the power on mode, the method comprising:

monitoring an environment of the server in real time;

recognizing the current mode of the server according to the detected environment of the server;

respectively acquiring power connection time when the server enters the power connection mode and startup time when the server enters the power on mode;

respectively counting that the server is only connected with power to obtain a power connection count and the startup of the server to obtain a startup count;

respectively acquiring induction information of the server when the server enters the power connection mode and the power on mode;

acquiring hardware load information of the server when the server enters the power on mode; and storing power connection information and startup information in the environment detecting system, wherein the power connection information comprises the power connection time, the power connection count, and the induction information of the server; the startup information comprises the startup time, the startup count, the induction information of the server, and the hardware load information, and the power connection information and the startup information forms the environment parameters of the server which are used as a reference of a reliability test of the server.

9. The method of recording environment parameters for a server as recited in claim 8, wherein the server comprises a power button, the method comprising:

when monitoring that a voltage of the server reaches a preset voltage, recognizing that the server enters the power connection mode; and when the power button is pressed and monitoring a startup signal of the server, recognizing that the server enters the power on mode.

10. The method of recording environment parameters for a server as recited in claim 9, wherein the server comprises a CPU, when the server enters the power connection mode, the server is only connected with power and the power button is not pressed, and only the environment monitoring system works; when the server enters the power on mode, the server is connected with power and the power button is pressed for power supply, and both the environment monitoring system and the CPU work.

11. The method of recording environment parameters for a server as recited in claim 8, further comprising:

determining whether a difference between the induction information generated on a current monitoring cycle and the induction information generated on a last stored monitoring cycle is greater than a preset value;

if the difference between the induction information generated on a current monitoring cycle and the induction information generated on a last stored monitoring cycle is greater than the preset value, storing the power connection information or the startup information of the current monitoring cycle in the environment monitoring system; and if the difference between the induction information generated on a current monitoring cycle and the induction information generated on a last stored monitoring cycle is less than the preset value, not storing the power connection information or the startup information of the current monitoring cycle in the environment monitoring system.

12. The method of recording environment parameters for a server as recited in claim 11, further comprising:

if the current monitoring cycle is a first monitoring cycle, determining whether a difference between the induction information generated on the first monitoring cycle and the induction information generated when the server enters the power connection mode or the power on mode at the first time is greater than the preset value.

13. The method of recording environment parameters for a server as recited in claim 8, wherein the induction information comprises voltage, environment temperature, rotation speed of the fans of the server.

14. The method of recording environment parameters for a server as recited in claim 8, wherein the server further comprises a CPU and a storage, and the hardware load information comprises the utilization rate of the CPU and the storage space of the storage.

\* \* \* \* \*